United States Patent [19]

Hyde

[11] 4,277,987
[45] Jul. 14, 1981

[54] CHAIN SAW SHARPENING APPARATUS

[76] Inventor: Frederick H. Hyde, Short St., Warwick, Queensland, Australia

[21] Appl. No.: 45,383

[22] Filed: Jun. 4, 1979

[30] Foreign Application Priority Data

Jun. 2, 1978 [AU] Australia .............................. PD4598

[51] Int. Cl.³ ............................................. B23D 63/10
[52] U.S. Cl. .................................................... 76/25 A
[58] Field of Search ............................ 76/25 A, 36, 31

[56] References Cited

U.S. PATENT DOCUMENTS

| 2,677,289 | 5/1954 | Fitch | 76/25 A |
| 3,055,238 | 9/1962 | Hazzard | 76/36 |
| 3,338,116 | 8/1967 | McLean | 76/36 |
| 4,131,038 | 12/1978 | Beerens | 76/25 A |

FOREIGN PATENT DOCUMENTS 725911 3/1955 United Kingdom ........................ 76/31

Primary Examiner—Othell M. Simpson
Assistant Examiner—Roscoe V. Parker
Attorney, Agent, or Firm—McAulay, Fields, Fisher, Goldstein & Nissen

[57] ABSTRACT

A chain saw sharpening apparatus is disclosed including a support member adapted in operation to locate about a chain saw in a predetermined relationship thereto and supporting two guide roller assemblies each including a pair of guide rollers disposed at opposite sides of said support whereby a file operatively supported on one said pair of guide rollers is disposed at an angle equal to the cutting edge angle of one set of teeth, while the other said pair of guide rollers operatively supports a file at angle equal to the cutting edge angle of the other set of teeth.

7 Claims, 5 Drawing Figures

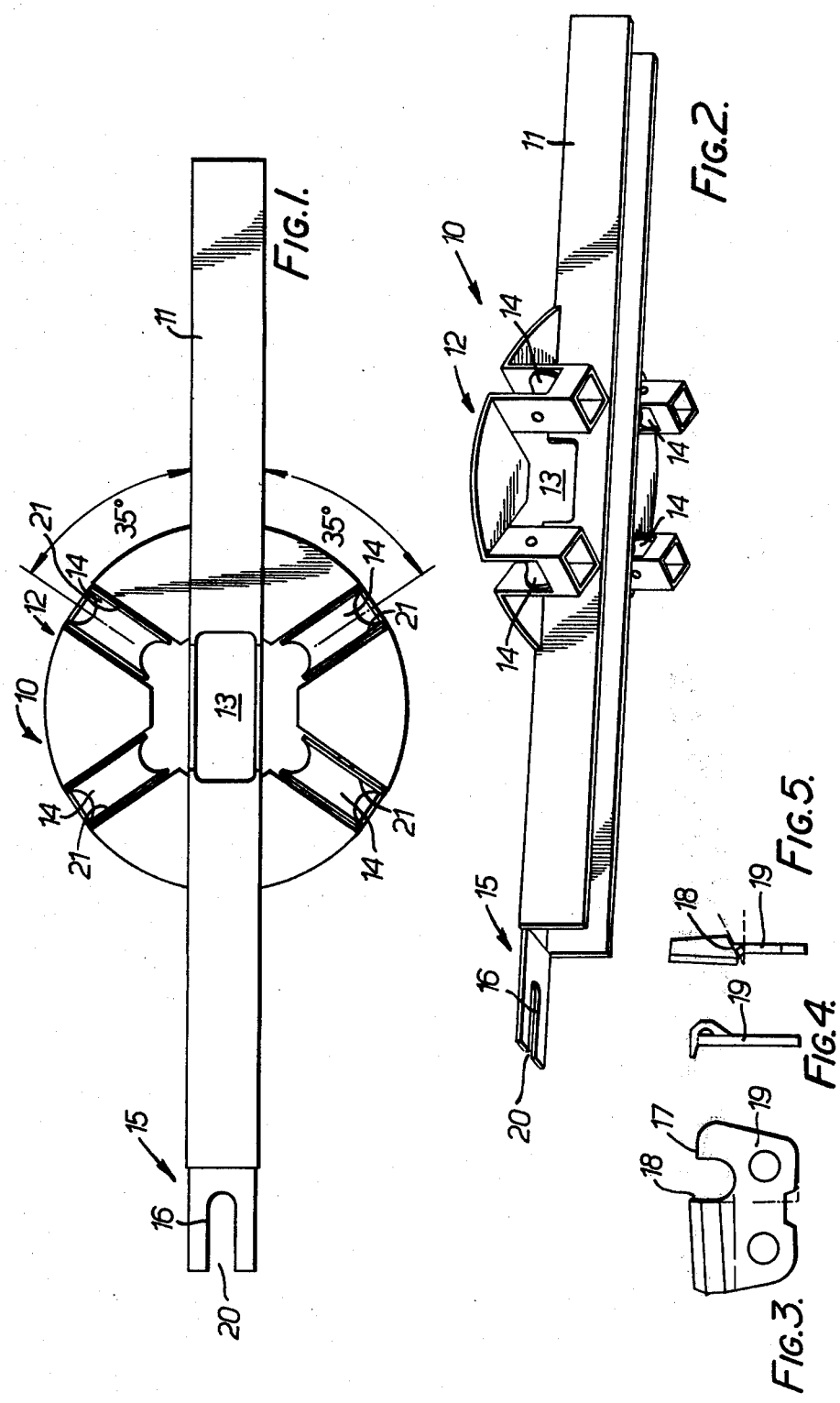

CHAIN SAW SHARPENING APPARATUS

This invention relates to apparatus for sharpening chain saw blades.

Chain saws cut by a planing action in which each successive cutter planes a small amount from the timber being cut. For this purpose, each cutting link of the chain saw includes a cutter having a leading gauge part and a trailing blade part, the latter having a cutting blade extending beyond the gauge part. This distance determines to amount of timber planed off by each link. The blade part has a face extending at a predetermined angle, usually 35° to the plane of the chain bar and it is desirable when the chain saw is blunt to accurately sharpen the blade to this angle. The blade part of each link tapers rearwardly so that upon each sharpening the height of the blade from the chain is decreased. Thus, the leading or gauge portion of the cutter has to be lowered to compensate, so that the correct amount is planed by each link.

Australian Pat. No. 26,894/77 in the name of Cornelis Johannes Beerens describes a chain saw sharpening guide which is provided with a pair of rollers for supporting the sharpening file at either side of the chain. The invention described in this specification was devised in order to overcome the prior art deficiencies and sets out the disadvantages of such prior art on pages 2, 3 and 4 as follows:

"This invention relates to a file guide device to be used to guide a file in the operation of sharpening the teeth of a saw. A number of guide devices are known for this purpose some of which merely provide a sight line for the operator to observe during the sharpening operation, and others which positively guide the file in the required path."

"An example of the sight line type of guide is disclosed in Australian Pat. No. 408,421 wherein a metal plate is provided with suitably disposed and shaped notches so that the plate may rest upon the chain of a chain saw with at least the tooth to be sharpened located in one notch in the plate and an adjacent tooth supporting the plate. The edge of the plate adjacent the notch which receives the tooth is formed at an angle corresponding to the angle at which the tooth should be sharpened, so that the operator may then sight the file with respect to this edge in an endeavor to maintain the correct angle of the file to the tooth during the sharpening operation. This device has the initial disadvantage that it still requires the operator to exercise skill in maintaining the file correctly aligned with the edge of the guide plate, and this alignment must be maintained while the operator is firstly, reciprocating the file across the cutting edge of the tooth, and at the same time, applying pressure to the file to hold it in cutting engagement with the tooth. Accordingly there is still a high risk that the operator will impart a rocking movement to the file during the sharpening operation so that the tooth is not sharpened at the correct angle."

"Another simple form of guide for sharpening hand saws is disclosed in Australian Pat. No. 160,234, wherein a member is clamped to the saw so as to straddle the teeth to be sharpened, and a roller is disposed on each side of the saw supported by the member to rotate about respective axes parallel to the length of the saw. The height of the rollers relative to the point of the teeth on the saw may be set so that the rollers act as a depth gauge, whilst the member also carries an adjustable guide plate having portions extending across the teeth at an angle corresponding to the angle at which the teeth should be sharpened. The file is rested against this guide plate during the sharpening operation which continues until the file has cut to a depth so that it engages the rollers. In this device, the face of the guide which is contacted by the file must inherently wear by the continual contact with the file and hence the accuracy of the guide is not maintained. In addition, as the file used for sharpening such saws is of a triangular cross-section, grooves will be cut in the guide by the file which will make it difficult to operate the file without becoming lodged in such grooves. Finally, when the file reaches the required depth and contacts the rollers, a binding situation will arise for as the file is attempting to move across the rollers at an inclination to their axes, it will also endeavour to move along the rollers, but this will be prevented by the teeth of the saw and a binding or lock-up situation will occur."

"Australian Pat. Nos. 8058/27 and 249518 both describe sharpening guides wherein the file is positively guided at the required angle to the saw teeth, but in each instance, these devices are quite complicated and not suitable to sharpening of saws in the field. The capability of sharpening of saws in the field is of major importance in regard to chain saws where the frequency of sharpening is quite high and under adverse working conditions, it may be necessary to sharpen a chain saw more than once a day."

"Another particular problem in sharpening chain saws, apart from maintaining the correct angle on the cutting face of the tooth, is that the operator whilst imparting the necessary reciprocating motion to the file must also apply pressure in a direction transverse to this motion to maintain the file in engagement with the cutting edge of the tooth. The need to apply this pressure in the transverse direction renders it difficult for the operator to maintain the correct angle of the file to the direction of the length of the saw. The maintenance of this transverse pressure is also relevant to the sharpening of a chain saw to maintain the file at the correct height in relation to the top face of the tooth being sharpened. These problems are made more difficult by the fact that normally the file is operated by one hand only, the other hand being used to hold the chain steady."

The Beerans sharpening apparatus has several disadvantages which the present invention aims to overcome. In particular, the Beerens apparatus is somewhat complicated and is relatively difficult to fix to the chain saw. In this respect, the Beerens guide is provided with a thumb screw which is used to clamp the guide to the tooth being sharpened. The clamping has to be effected accurately and the apparatus has to be unclamped and reclamped for each tooth. Furthermore, the Beerens apparatus has the disadvantage that the portion of the file in engagement with the tooth being sharpened is partially concealed by the pivotable top plate of the apparatus which, furthermore, has to be pivoted from one tooth to the next. As such devices are used in field conditions, it is very likely that the pivotable guide head will not be set accurately for each tooth and this is a further disadvantage of the Beerens invention.

Furthermore, as shown in the publication entitled "Oregon Maintenance Manual" published by Omark Industries, Inc. (Reference number E 18 - 27 GB) "chisel chains" require special sharpening techniques as set out in this publication as follows:

"Hold file handle down 10° as you make a few light strokes forward, applying file pressure against cutting edge. File all cutters on side opposite yourself, then move to other side of chain to file all cutters on other side."

Thus, to enable chisel saws to be sharpened, it is necessary to tilt the file for the last few strokes to sharpen the chisel end of the chain. With the Beerens apparatus the guide is clamped to the saw tooth and cannot be tilted the 10° necessary to sharpen such chains and the flanges of the rollers prevent the file being freely tilted for this purpose.

Accordingly, the present invention has been devised to provide chain saw sharpening apparatus which will overcome the disadvantages of the prior art and which will enable chain saws to be sharpend quickly and efficiently. Other objects and advantages of the invention will become apparent from the following description.

With the foregoing and other objects in view, this invention resides broadly in chain saw sharpening apparatus including, a support member adapted in operation to locate about a saw chain in predetermined relationship thereto and supporting two guide roller assemblies each including a pair of guide rollers disposed at opposite sides of said support member for rotation about axes disposed, when the apparatus is operatively supported about said saw chain, in a plane substantially at right angles to the face of the saw chain supporting bar and substantially parallel to the longitudinal run portions of said saw chain and said guide roller assemblies being so made and arranged that a file operatively supported on one said pair of guide rollers is disposed at an angle of inclination to said supporting bar face equal to the selected cutting edge angle of one set of saw teeth, while the other said pair of guide rollers operatively supports a file at an angle of inclination to said supporting bar face equal to the selected cutting edge angle of the other set of saw teeth.

In order that the invention may be more readily understood and put into practical effect, reference will now be made to the accompanying drawings which illustrate a preferred embodiment of the invention and wherein:

FIG. 1 is a plan view of chain saw sharpening apparatus according to the present invention;

FIG. 2 is an underneath perspective view of the apparatus illustrated in FIG. 1, and FIGS. 3–5 illustrate several views of a chain saw link showing the preferred configuration of the parts thereof.

As shown, the sharpening apparatus 10 comprises an elongate channel shaped support member 11 adapted to fit over the chain and supporting intermediate its ends a guide roller assembly 12 adapted to guide a round file past the cutting edge of a respective link at the correct angle. For this purpose, the roller guide assembly 12 is positioned about a top cutout 13 in the support member 11 in which a respective chain link is exposed.

The roller guide assembly 12 includes a pair of guide rollers 14 at each side of the channel-shaped member 11, each of which is adapted to co-operate with a respective roller at the opposite side to locate and support a round file at spaced positions at either side of the channel-shaped member 11. The respective cooperating pairs of guide rollers are arranged at an angle of 35° as shown, to the support member 11, being an angle equal to the selected cutting edge angle defined in relation to the saw chain supporting bar face and the longitudinal run portion of the saw chain, and the rollers 14 are disposed such that when a file is supported in the part-circular grooves of the guide rollers 14, the file is operatively positioned with respect to the cutting edge 18 of the cutting link 19 to sharpen the cutting edge 18 at the correct angle.

One end of the support member 11 is provided with a depth gauge 15 having a top surface 16 disposed at the correct level of the gauge portion with respect to the leading edges of the links upon which the support member rests so that the depth gauge 15 may be filed to its correct height at which it is level with the top surface 16. For this purpose, the top surface is provided with a slot 20 through which the gauge portion 17 may extend.

The guide rollers 14 are preferably knurled and are formed of hardened steel and may be arranged removably so that they may be replaced with rollers of a different size for use with a different size chain or file. For a smaller chain, which would use a smaller circular file, the diameter of the rollers would be larger to support the file at the correct position relative to the blade part of the chain link 19.

It will be seen that the rollers 14 are supported for rotation about axes in a plane at right angles to the guide bar about which the chain extends and that the flanges 21 of the rollers are so aligned that the file will be in the correct operative alignment when held thereagainst, while the base of the rollers limits the depth of the gullet cut by the file. Thus, by aligning the rollers in this manner, the file may be tilted as previously set forth in the Organ Handbook to sharpen chisel chains. Furthermore, for this purpose, it is preferred that the channel-shaped support member 11 is a floating fit about the chain so that the whole apparatus can be tilted slightly to assist in obtaining correct alignment between the file and the blade.

The provision of two sets of guide rollers is essential to the present invention as each pair of rollers is aligned at 35° to the chain bar and thus a single pair of rollers cannot be utilised as reversal of the apparatus about the chain bar does not align with that pair of rollers correctly for the opposite hand blades, it being realized of course that the adjacent cutting links are arranged with opposite hand cutting edges, whereby there are provided two sets of cutting links having oppositely arranged cutting edges. The two sets of fixed rollers are incorporated in the present apparatus in lieu of one set supported on a pivoting carrier as per the Beerens invention so as to reduce inaccuracies which may occur during pivoting of the supporting head and to ensure that the central portion of the guide device at which the cutting link of the chain is contacted by the file will be clearly visual so that the operator can at all times see exactly what he is doing in order to maintain accurate control during the sharpening process.

Accordingly, it will be seen that the present invention provides sharpening apparatus which may be utilised in the field to accurately sharpen saw chains quickly and efficiently. After each cutting edge is sharpened, the apparatus is simply slid along the chain to the next blade to be sharpened. Thus, there is virtually no setting up time for each sharpening operation.

It will of course be realised that the above has been given by way of illustrative example only of a preferred embodiment of the invention, and of course all such modifications and variations as would be apparent to persons skilled in the art are deemed to fall within the broad scope and ambit of the invention as is defined in the appended claims.

I claim:

1. Chain saw sharpening apparatus including, a support member adapted in operation to locate about a saw chain in predetermined relationship thereto and supporting two guide roller assemblies each including a pair of guide rollers disposed at opposite sides of said support member for rotation about axis disposed, when the apparatus is operatively supported about said saw chain, in a plane substantially at right angles to the face of the saw chain supporting bar and substantially parallel to the longitudinal run portions of said saw chain, each said guide roller having a concave peripheral surface, defining a file seat, and said guide roller assemblies being so made and arranged that a file operatively supported on one said pair of guide rollers and seated on respective said concave peripheral surfaces is disposed at an angle of inclination to said supporting bar face equal to the selected cutting edge angle of one set of saw teeth, while the other said pair of guide rollers operatively supports a file in a similar manner at an angle of inclination to said supporting bar face equal to the selected cutting edge angle of the other set of saw teeth.

2. Chain saw sharpening apparatus according to claim 1, wherein said guide rollers are disposed about a central opening in said support member and the innermost edges of said rollers are spaced outwardly from said central opening to enable the saw tooth to be sharpened to be exposed and clearly visible in said opening.

3. Chain saw sharpening apparatus according to claim 2, wherein said support member is an elongate channel-shaped member adapted to fit loosely about the said saw chain.

4. Chain saw sharpening apparatus according to claim 3, wherein the base of one end of said channel-shaped support member is slotted and is bent inwardly from the remaining portion thereof to pass about the respective gauge portions of the saw chain.

5. Chain saw sharpening apparatus according to claim 1 or 2 wherein said guide roller peripheral surfaces are knurled.

6. Chain saw sharpening apparatus as claimed in claim 1, wherein each pair of said guide rollers is arranged at an angle of approximately 35° to said support member.

7. Chain saw sharpening apparatus as claimed in claim 1, wherein said guide rollers are removably arranged in said guide rollers assemblies so that they can be replaced with rollers of a different size for use with a different size saw chain or file whereby to support the file at the correct position relative to the saw teeth.

* * * * *